(12) United States Patent  
Lindner et al.

(10) Patent No.: US 11,475,337 B1  
(45) Date of Patent: Oct. 18, 2022

(54) PLATFORM TO DELIVER ARTIFICIAL INTELLIGENCE-ENABLED ENTERPRISE CLASS PROCESS EXECUTION

(71) Applicant: Virtustream IP Holding Company LLC, Bethesda, MD (US)

(72) Inventors: Maik A. Lindner, Marietta, GA (US); Sean C. O'Brien, Atlanta, GA (US); Eloy F. Macha, Las Cruces, NM (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 1142 days.

(21) Appl. No.: 15/798,697

(22) Filed: Oct. 31, 2017

(51) Int. Cl.  
*G06N 5/04* (2006.01)  
*G06N 3/08* (2006.01)  
*H04L 41/00* (2022.01)  
*G06N 20/00* (2019.01)

(52) U.S. Cl.  
CPC .............. *G06N 5/045* (2013.01); *G06N 3/08* (2013.01); *G06N 20/00* (2019.01); *H04L 41/30* (2013.01)

(58) Field of Classification Search  
CPC .................................. G06N 3/08; G06N 5/045  
See application file for complete search history.

(56) References Cited

U.S. PATENT DOCUMENTS

| | | | |
|---|---|---|---|
| 10,262,019 B1 | 4/2019 | Reiner et al. | |
| 10,581,675 B1 | 3/2020 | Iyer | |
| 2003/0036940 A1* | 2/2003 | Leymann | G06Q 10/10 |
| | | | 705/7.26 |
| 2003/0167265 A1* | 9/2003 | Corynen | G06Q 10/04 |
| 2007/0019781 A1* | 1/2007 | Haras | A61B 6/02 |
| | | | 378/4 |

(Continued)

OTHER PUBLICATIONS

Wikipedia, Business Process Model and Notation (BPMN), https://en.wikipedia.org/w/index.php?title=Business_Process_Model_and_Notation&oldid=804950746, Oct. 12, 2017.

(Continued)

*Primary Examiner* — George Giroux  
(74) *Attorney, Agent, or Firm* — Ryan, Mason & Lewis, LLP

(57) ABSTRACT

An apparatus in one embodiment comprises a processing platform that includes a plurality of processing devices each comprising a processor coupled to a memory. The processing platform is configured to implement at least a portion of at least a first cloud-based system. The processing platform comprises a modelling language extension module configured to implement artificial intelligence-based decision points into a process flow and compile context attributes associated with the artificial intelligence-based decision points based on data from artificial intelligence systems. The processing platform also comprises a process engine configured to convert the artificial intelligence-based decision points and context attributes to input to a process optimization algorithm, and an optimization engine configured to determine, by applying the process optimization algorithm to the converted input, an overall execution path within the process flow, and output a decision to a first of the artificial intelligence-based decision points based on the overall execution path.

20 Claims, 12 Drawing Sheets

(56) References Cited

U.S. PATENT DOCUMENTS

| | | | |
|---|---|---|---|
| 2007/0094542 A1* | 4/2007 | Bartucca | G06F 11/3672 |
| | | | 714/38.1 |
| 2008/0306798 A1 | 12/2008 | Anke | |
| 2010/0241828 A1* | 9/2010 | Yu | H04L 12/44 |
| | | | 712/30 |
| 2011/0066456 A1* | 3/2011 | Lu | G06Q 10/063 |
| | | | 705/1.1 |
| 2011/0138050 A1 | 6/2011 | Dawson | |
| 2011/0238458 A1 | 9/2011 | Purcell | |
| 2011/0265081 A1 | 10/2011 | Lucovsky | |
| 2012/0005236 A1 | 1/2012 | Deng | |
| 2012/0016778 A1 | 1/2012 | Salle | |
| 2012/0016833 A1* | 1/2012 | Janiesch | G06Q 10/067 |
| | | | 706/50 |
| 2012/0147894 A1 | 6/2012 | Mulligan | |
| 2012/0239739 A1 | 9/2012 | Manglik | |
| 2013/0066940 A1 | 3/2013 | Shao | |
| 2013/0173918 A1 | 7/2013 | Saraswat | |
| 2013/0191218 A1 | 7/2013 | Predescu | |
| 2013/0232463 A1 | 9/2013 | Nagaraja | |
| 2013/0263209 A1 | 10/2013 | Panuganty | |
| 2014/0108234 A1* | 4/2014 | Mayerle | G06Q 10/10 |
| | | | 705/39 |
| 2014/0143422 A1 | 5/2014 | Joseph | |
| 2014/0201218 A1* | 7/2014 | Catalano | H04L 41/5045 |
| | | | 707/748 |
| 2014/0278623 A1 | 9/2014 | Martinez | |
| 2014/0337429 A1 | 11/2014 | Asenjo | |
| 2015/0193583 A1* | 7/2015 | McNair | G16H 50/20 |
| | | | 705/2 |
| 2016/0065417 A1 | 3/2016 | Sapuram | |
| 2016/0217371 A1* | 7/2016 | Leithiser | G06F 16/28 |
| 2016/0337175 A1 | 11/2016 | Rao | |
| 2018/0095778 A1 | 4/2018 | Aydelott et al. | |
| 2018/0131583 A1 | 5/2018 | Barrows | |
| 2018/0331928 A1 | 11/2018 | Dave et al. | |
| 2018/0341248 A1* | 11/2018 | Mehr | G06N 3/08 |
| 2019/0012149 A1 | 1/2019 | Garza et al. | |
| 2019/0036789 A1 | 1/2019 | Kaplunov et al. | |
| 2019/0057548 A1* | 2/2019 | Singh | G06K 9/6263 |

OTHER PUBLICATIONS

Wikipedia, BPEL (Business Process Execution Language), https://en.wikipedia.org/w/index.php?title=Business_Process_Execution_Language&oldid=786392224, Jun. 19, 2017.

Wikipedia, Event-driven process chain (EPC), https://en.wikipedia.org/w/index.php?title=Event-driven_process_chain&oldid=771078397, Mar. 19, 2017.

Wikipedia, Architecture of Integrated Information Systems, https://en.wikipedia.org/w/index.php?title=Architecture_of_Integrated_Information_Systems&oldid=782492788, May 27, 2017.

Wikipedia, AWS Lambda, https://en.wikipedia.org/w/index.php?title=AWS_Lambda&oldid=790050312, Jul. 11, 2017.

E. Hormozi, H. Hormozi, M.K. Akbari and M.S. Javan, Using of Machine Learning into Cloud Environment (A Survey): Managing and Scheduling of Resources in Cloud Systems, 2012 Seventh International Conference on P2P, Parallel, Grid, Cloud and Internet Computing, Victoria, BC, 2012, pp. 363-368 (Year: 2012).

\* cited by examiner

FIG. 10

Maximize $(\text{Margin total}) = \dfrac{(Price_1 - Cost_1) + (Price_2 - Cost_2) + (Price_k - Cost_k)}{k}$, wherein k = components to be provisioned Subject to $capacity_{11} usage_1 + capacity_{12} usage_2 + \cdots + capacity_{1k} usage_k \leq q_1$ $capacity_{21} usage_1 + capacity_{22} usage_2 + \cdots + capacity_{2k} usage_k \leq q_2$ $\ldots$ $capacity_{n1} usage_1 + capacity_{n2} usage_2 + \cdots + capacity_{nk} usage_k \leq q_n$ $x_1, x_2, \ldots x_k \geq 0$

1000

PLATFORM TO DELIVER ARTIFICIAL INTELLIGENCE-ENABLED ENTERPRISE CLASS PROCESS EXECUTION

FIELD

The field relates generally to information processing systems, and more particularly to techniques for process execution using artificial intelligence (AI) capabilities in information processing systems.

BACKGROUND

Information processing systems increasingly utilize reconfigurable virtual resources to meet changing user needs. For example, cloud computing and storage systems implemented using virtual machines have been widely adopted. Such cloud-based systems include, for example, Amazon Web Services (AWS), Google Cloud Platform (GCP), and Microsoft Azure. Despite the widespread availability of these and numerous other private, public and hybrid cloud offerings, there exists a significant problem in conventional practice in that there is no adequate mechanism available for optimizing multi-cloud deployments during run-time utilizing the benefits of artificial intelligence.

SUMMARY

Illustrative embodiments of the present invention provide information processing systems configured to deliver artificial intelligence-enabled enterprise class process execution.

In one embodiment, an apparatus comprises a processing platform that includes a plurality of processing devices each comprising a processor coupled to a memory. The processing platform is configured to implement at least a portion of at least a first cloud-based system. The processing platform further comprises a process modelling language extension module configured to implement multiple artificial intelligence-based decision points into a process flow and compile one or more context attributes associated with the multiple artificial intelligence-based decision points based on data derived from one or more artificial intelligence systems. The processing platform also comprises a process engine configured to convert the multiple artificial intelligence-based decision points and the one or more context attributes to input to a process optimization algorithm, and an optimization engine configured to determine, by applying the process optimization algorithm to the converted input, an overall execution path within the process flow, and output a decision to a first of the multiple artificial intelligence-based decision points based on the determined overall execution path within the process flow.

Illustrative embodiments can provide significant advantages relative to conventional enterprise cloud computing platforms. For example, challenges associated with the limitations of traditional process automation systems are overcome through combining AI systems and automation systems for processes to generate intelligent, automated, and optimized technical and business process execution. One or more embodiments of the invention can include utilizing AI techniques in conjunction with operations research methods to enable optimization and automation in the execution of processes requiring human intervention in traditional systems.

These and other illustrative embodiments described herein include, without limitation, methods, apparatus, systems, and computer program products comprising processor-readable storage media.

BRIEF DESCRIPTION OF THE DRAWINGS

FIG. 10 shows an example linear programming formula in an illustrative embodiment.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
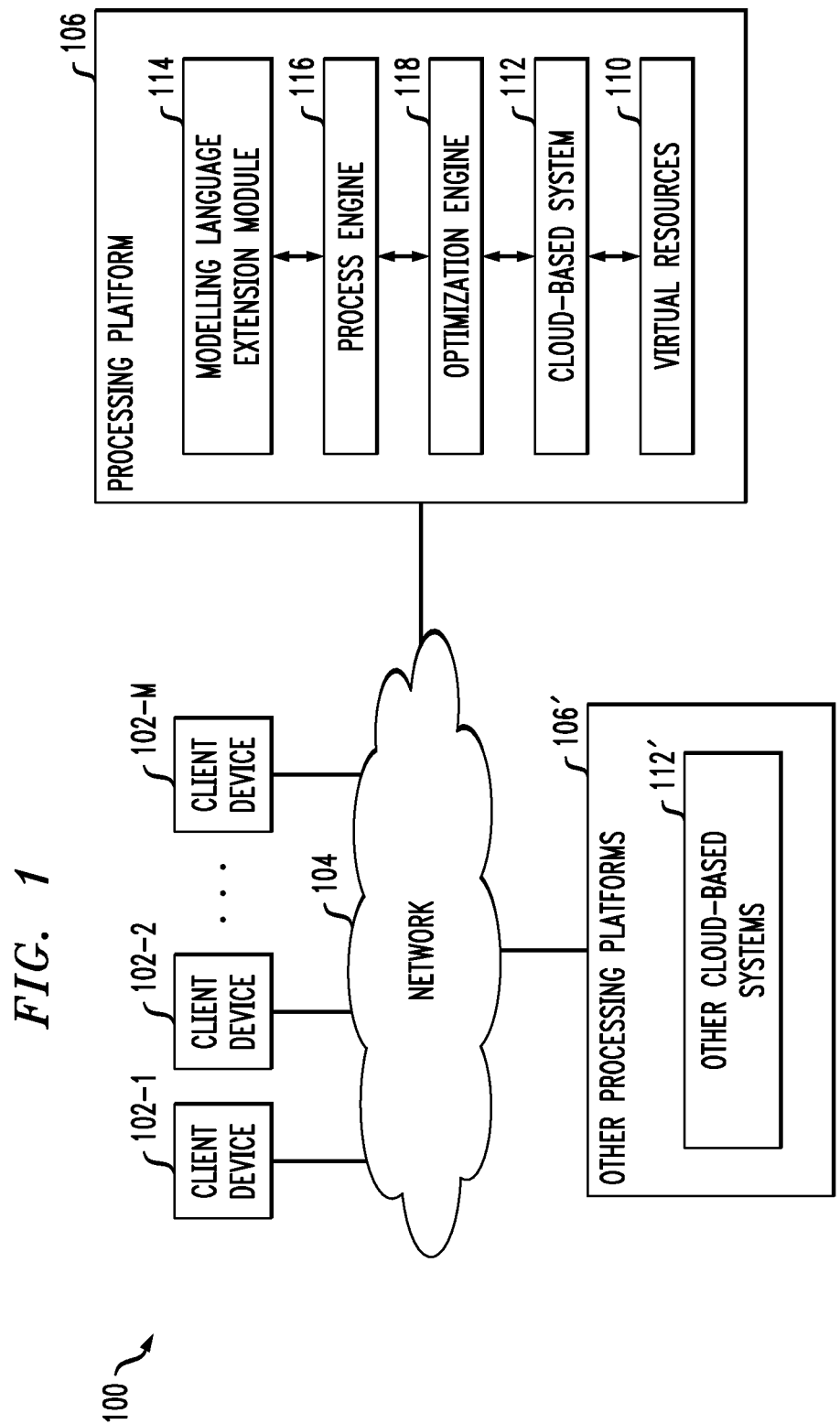
FIG. 1 is a block diagram of an information processing system configured for cloud resource planning in an illustrative embodiment.

FIG. 1 shows an information processing system 100 configured in accordance with an illustrative embodiment of the present invention. The information processing system 100 comprises a plurality of client devices 102-1, 102-2, . . . 102-M coupled via a network 104 to a processing platform 106.

The client devices 102 in this embodiment can comprise, for example, desktop, laptop or tablet computers, mobile telephones, or other types of processing devices capable of communicating with the processing platform 106 over the network 104. Clients associated with the respective client devices 102 are assumed to run respective sets of client applications utilizing corresponding sets of virtual resources 110 of at least one cloud-based system 112 provided by the processing platform 106. For example, such clients may be respective tenants of a cloud data center or other type of multi-tenant environment provided by the processing platform 106. These tenants or other clients are examples of what are more generally referred to herein as respective "users" of the processing platform 106. Such users are also intended to include customers of a cloud service provider.

In some embodiments, the virtual resources 110 comprise a plurality of containers allocable to respective client applications under the control of the cloud-based system 112. Additional or alternative virtual resources that may be used in a given embodiment include virtual machines. For example, the virtual resources may comprise a plurality of virtual machines allocable to respective ones of the client applications under the control of the cloud-based system 112. Various combinations of containers, virtual machines and other virtual resources may be used in other embodiments. For example, virtual resources may comprise containers running in virtual machines.

The network 104 over which the client devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as Wi-Fi or WiMAX, or various portions or combinations of these and other types of communication networks.

The processing platform 106 is assumed to include a plurality of processing devices each having a processor coupled to a memory, and is configured to implement the virtual resources 110 of the cloud-based system 112 for use by client applications.

The processing platform 106 further comprises a modelling language extension module 114, a process engine 116, and an optimization engine 118, each associated with the cloud-based system 112. The cloud-based system 112 is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private cloud aspects and thus may include various combinations of on-premises and off-premises portions, such as on-premises placement of managed appliances that can be consumed on-demand like off-premises cloud capacity, but at the same time offer the benefits of on-premises deployments such as security, compliance and physical control.

The modelling language extension module 114 is configured to implement multiple artificial intelligence-based decision points into a process flow and compile one or more context attributes associated with the multiple artificial intelligence-based decision points based on data derived from one or more artificial intelligence systems. The process engine 116 is configured to convert the multiple artificial intelligence-based decision points and the one or more context attributes to input to a process optimization algorithm. The optimization engine 118 is configured to determine, by applying the process optimization algorithm to the converted input, an overall execution path within the process flow, and output a decision to a first of the multiple artificial intelligence-based decision points based on the determined overall execution path within the process flow.

An exemplary process utilizing modelling language extension module 114, process engine 116, and optimization engine 118 of the processing platform 106 in information processing system 100 will be described in more detail with reference to the flow diagram of FIG. 11.

Also, by way of example, in some embodiments, a different cloud-based system comprises another cloud-based system implemented with cloud-based system 112 on the processing platform 106. Alternatively, the different cloud-based system can comprise another cloud-based system 112' implemented on a different processing platform 106' coupled to the network 104.

It is to be appreciated that the particular processing platform configuration illustrated in the FIG. 1 embodiment is presented by way of example only, and that other embodiments can utilize other arrangements of additional or alternative components. For example, functionality disclosed herein as being associated with two or more separate components can in other embodiments be combined into a single component.

A more particular example of an additional component that can be included in the processing platform 106 is a resource abstraction layer. Such a resource abstraction layer may be associated with the cloud-based system 112 and may comprise one or more resource abstraction frameworks such as a Mesos framework or a Cloud Foundry Diego framework. A given such framework can be configured to abstract away underlying virtual resources 110 from client applications that utilize those virtual resources.

As mentioned previously, the virtual resources 110 implemented by the processing platform 106 illustratively comprise containers. Such containers are more particularly assumed to comprise respective Docker containers or other types of Linux containers (LXCs). In embodiments that utilize containers, the processing platform 106 illustratively comprises a plurality of container host devices each implementing one or more of the containers. Each of the container host devices illustratively comprises at least one processor coupled to a memory. Such container host devices are examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes. Such cluster managers may be implemented within or in association with the cloud-based system 112.

The processing platform 106 can also incorporate one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates additional functionality, such as management and orchestration functionality. The management and orchestration functionality may be implemented, for example, in the cloud-based system 112 or components thereof, and can be provided, for example, using components such as VCE Vision™ Intelligent Operations Software, or other types of management and orchestration components, including components from Pivotal Cloud Foundry, or various combinations of multiple ones of these or other components.

In some embodiments, certain functionality of the cloud-based system 112 is made available to a user by a cloud service provider on a Software-as-a-Service (SaaS) basis. Such users may be associated with respective ones of the client devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 12 and 13. A given such processing platform comprises at least one processing device comprising a processor coupled to a memory, and the processing device may be implemented at least in part utilizing one or more virtual machines or other virtualization infrastructure. Additionally, the operation of the information processing system 100 will be described in further detail with reference to the flow diagram of FIG. 11.

As used herein, artificial intelligence refers to any device that perceives its environment and takes actions that maximize its chance of success at some goal. In one or more embodiments of the invention, AI techniques and system approaches can be used to set attributes of decision points in process flows. Additionally, techniques and approaches from technical routing in networking, path optimization and decision theory can be used to solve an optimization problem during process execution, and input for such models can be derived from the AI-based decision point elements.

In at least one embodiment of the invention, an optimal decision for individual AI-based process steps includes not only the local maximum in terms of optimal output, but also the global maximum for the overall end-to-end process. Accordingly, in such an embodiment, decision trees and/or linear programming can be used for each automated AI-based decision point. An optimal decision can include a decision that leads to at least as good an outcome as all other available decision options, and in order to compare the different decision outcomes, a relative utility can be assigned to each outcome.

Additionally, one or more embodiments of the invention can include utilizing operations research (OR) techniques in solving a process routing optimization problem. For example, such an embodiment can include utilizing linear programming (LP) to optimize for AI-based decision point elements within a process, wherein linear programming represents a method to achieve a desired outcome (such as maximum profit or a lowest cost) in a mathematical model whose requirements are represented by linear relationships.

Also, one or more embodiments of the invention can include utilizing decision trees to enable the determination of maxima for a given process. As used herein, a decision tree refers to a mathematical method that uses a tree-like graph or model of attributes, such as probabilities and their possible consequences, chance event outcomes, resource costs, and utility. In at least one embodiment of the invention, decision trees can use input in the form of recommendations and probabilities derived from AI-based decision points.

As also detailed herein, and within which one or more embodiments of the invention can be implemented, a cloud resource planning (CRP) platform can provide integrated multi-cloud management for flexibility in a multi-vendor cloud environment. At least one embodiment of the invention can include providing supply chain-oriented services for cloud product needs of an enterprise, as well as facilitating dynamic and automated processes to allow the enterprise to scale up and/or down from end-user clients, via communication capabilities, and into backend systems. Additionally, one or more embodiments of the invention can include implementing continuous and/or periodic improvements to an enterprise information technology landscape through use of artificial intelligence (AI) and deep learning during technical and business process execution.

Further, in one or more embodiments of the invention, design recommendations and landscape optimizations can be provided by CRP agents based on machine learning techniques (for example, via a recommendations system with smart AI-based agents). As additionally detailed herein, CRP provides frictionless cloud service processes across service providers (open to partners via shared application programming interfaces (APIs) and processes), as well as provides a single management console for technical and business units across an orchestrated cloud landscape.

Enterprise trends can be used to define required features for an implementation by CRP. For example, at least one embodiment of the invention can include implementation of AI and/or machine learning techniques on big data (landscape deployment and operations experience, for example) with forecasting capabilities. Also, one or more embodiments of the invention can include facilitating both an external and an internal perspective on operations.

As noted herein, open interfaces into the CRP platform allow for integration of external services, and therefore forming of new business and technical processes. External services can be plugged-in via an API, and a CRP workflow engine can help to connect the service pieces into a bigger process and enable a flow. Also, in one or more embodiments of the invention, the CRP platform is hardware-agnostic due to a holistic approach, which is independent from specific service providers as well as hardware providers. Core technologies and established practices such as, for example, IT landscape management, monitoring, troubleshooting, security management, and policy execution can be combined and brought onto a single process flow as services. At the same time, the platform is opened to partners and other service providers. In combination with underlying process execution support, one or more embodiments of the invention includes enabling multi-provider, multi-cloud service provisioning and optimization of end-user IT processes.

Accordingly, and as further described herein, at least one embodiment of the invention can include automate ad hoc planning and execution of an end-user IT landscape via a CRP platform, wherein such an IT landscape can include one or more cloud services, one or more business processes, and one or more technical processes, in conjunction with available cloud resources. Additionally, as used herein, "ad hoc" planning and execution of an end-user IT landscape refers to a specific end-user selected or designed IT landscape, wherein the end-user is enabled (via the CRP platform) to deploy and/or implement particular cloud services, business process, technical processes and/or cloud resources with the single CRP platform based on the offerings and capabilities of the CRP platform.

Figure 2:
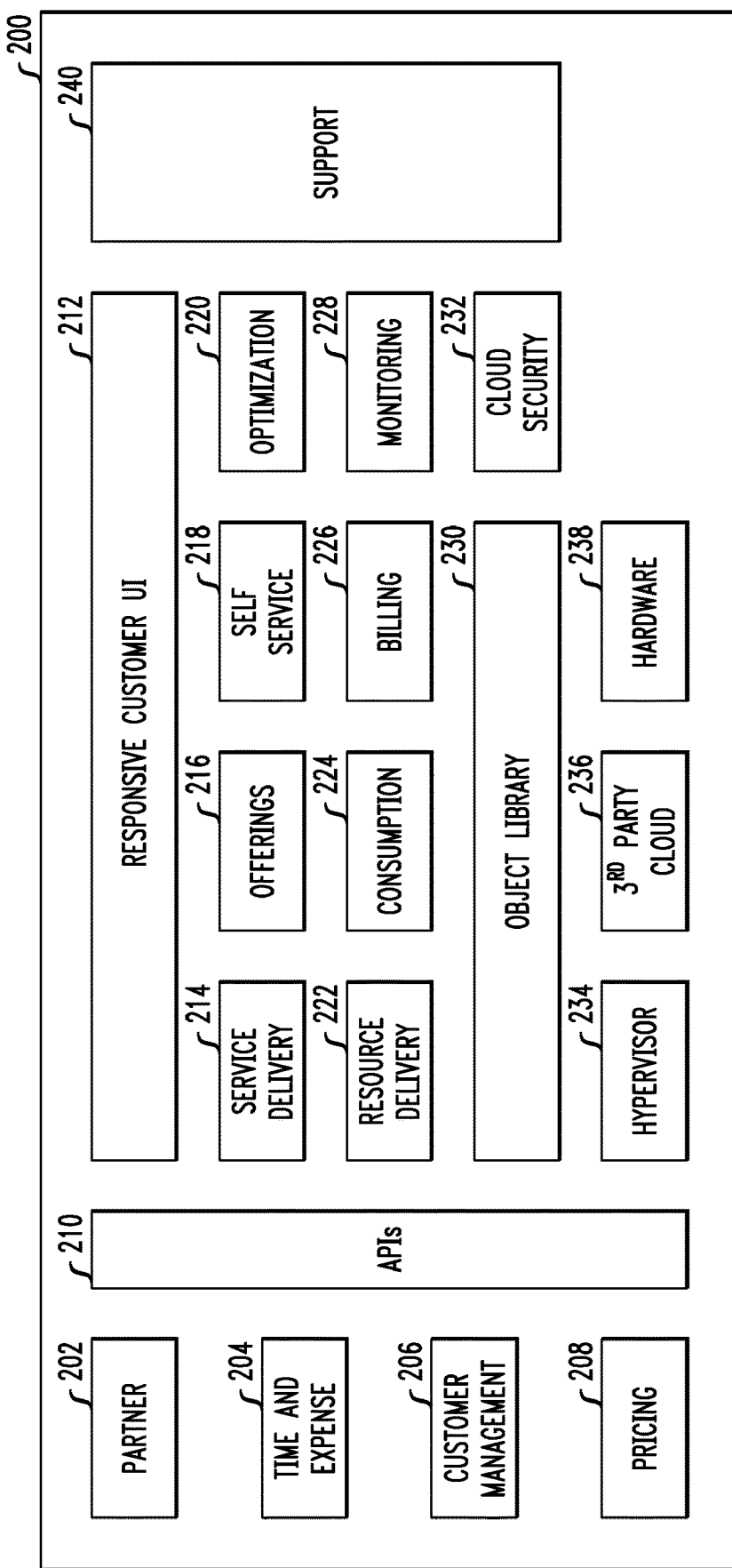
FIG. 2 shows an example cloud resource planning component overview in an illustrative embodiment.

FIG. 2 shows an example cloud resource planning component overview in an illustrative embodiment. By way of illustration, FIG. 2 depicts a CRP platform 200, which includes a partner component 202, a time and expense component 204, a customer management component 206, and a pricing component 208. The platform 200 also includes API componentry 210, a responsive customer user interface (UI) 212, and a support component 240. Further, the platform 200 includes a service delivery component 214, an offerings component 216, a self-service component 218, an optimization component 220, a resource delivery component 222, a consumption component 224, a billing component 226, and a monitoring component 228. Additionally, as depicted in FIG. 2, the CRP platform 200 includes an object library 230, a cloud security component 232, a hypervisor 234, a third party cloud component 236, and a hardware component 238.

As detailed herein, CRP can help an organization compose, execute, monitor, manage and optimize business-related services such as a cloud supply chain, procurement processes, inventory matters, finance matters, service lifecycles, projects, human resources and other components of a service fulfillment through a common dashboard. For example, a cloud service provider can utilize the CRP platform to enable ecosystem integration and leverage core expertise of a partner network for (complex) service composition. Also, in at least one embodiment of the invention, the CRP platform includes a role-dependent view of business and technical aspects of multi-cloud deployments.

Additionally, a customer can utilize the CRP platform, for example, to compose services internally, wherein such services can be enabled to leverage certain external components as business or technical needs dictate. Further, a vendor or independent service provider can utilize the CRP platform, for example, to offer a service or product for use in the platform, wherein such offerings can then be delivered to customers using the platform.

As illustrated in connection with FIG. 1 and also further described herein, one or more embodiments of the invention include a framework that includes incorporating technical services such as enterprise cloud service middleware, implemented business and technical processes, and flexible service module integration and technology utilization. Such a framework can also include a dynamic offering catalog, wherein such an offering catalog includes a service interface to allow for third parties to introduce offerings. The CRP platform can also maintain cross-service metadata pertaining to end-to-end technical and business processes, for example, to establish a consistent service provisioning across independent providers for service modules and technical cloud resources. In at least one embodiment of the invention, the inclusion of a logical cloud composition check supports the compatibility of service modules and consumed cloud resources, and virtual assistance and smart agents help to design comprehensive composed services based on enterprise cloud service design patterns.

Additionally, in one or more embodiments of the invention, the CRP platform provides functions and/or properties such as one or more catalogs, a user interface framework, a metadata repository, service registration, and general communication between service providers and end-users/consumers. The framework detailed herein can offer a single entry point in the form of a portal for role-based cloud service consumers and providers, wherein a single business and technical view is created across potentially independent services which rely on potentially dispersed infrastructure resources. Further, and by way of example, the CRP platform can define interfaces such as interfaces for integrating pricing capabilities from pricing engines, interfaces for integrating customer management from CRM systems, and interfaces for integrating billing systems.

Figure 3:
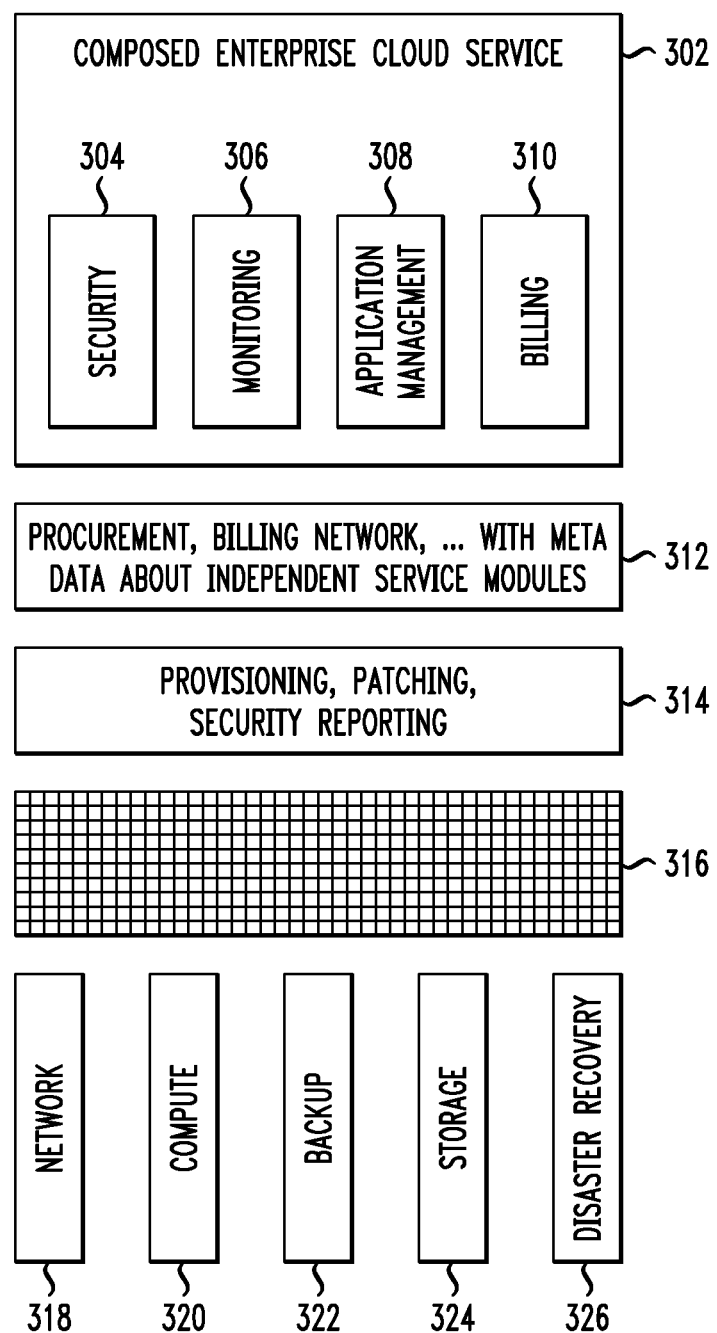
FIG. 3 shows an illustrative embodiment of an information processing system configured for cloud resource planning with multi-provider service composition in an illustrative embodiment.

FIG. 3 shows an illustrative embodiment of an information processing system configured for cloud resource planning with multi-provider service composition in an illustrative embodiment. By way of illustration FIG. 3 depicts a composed enterprise cloud service 302 which includes independent service modules 304 (a security service module), 306 (a monitoring service module), 308 (an application management service module), and 310 (a billing service module). Additionally, FIG. 3 depicts a business processes component 312, which can encompass business processes such as procurement, billing, network capabilities, etc., and which compiles metadata pertaining to the independent service modules 304, 306, 308 and 310. FIG. 3 also depicts a technical processes component 314, which can encompass technical processes such as provisioning, patching, security reporting, etc.

As also illustrated, FIG. 3 depicts technical integration adapters for technical resources, such as a network integration adapter 318, a computation integration adapter 320, a backup integration adapter 322, a storage integration adapter 324, and a disaster recovery integration adapter 326. Such technical integration adapters can enable efficient interaction with a multi-provider and multi-technology setup. As detailed in FIG. 3, interfaces to IT services such as, for example, compute, network and storage provisioning can be deployed in a structured and open interface style to allow for a wide ecosystem and business system integration.

FIG. 3 also depicts a service integration middleware 316, which serves as a bridge between the independent service modules, the business processes, the technical processes and integration adapters for technical resources. The service integration middleware 316 also facilitates communication and data management for the distributed services and processes across the CRP platform. Specifically, the service integration middleware 316 enables integration with multiple different underlying cloud technologies by allowing different modules from different providers to interact seamlessly via the CRP platform, even when those modules are functionally similar. For example, interactions between several different computation integration adapters (320) from several different providers (AWS, VMWare, etc.) can be integrated to service integration middleware 316 in a way that for technical processes component 314, those adapters present effectively the same behavior. Accordingly, one or more embodiments of the invention can include implementing and utilizing multiple different adapters; for example, one adapter for each function of each cloud.

Figure 4:
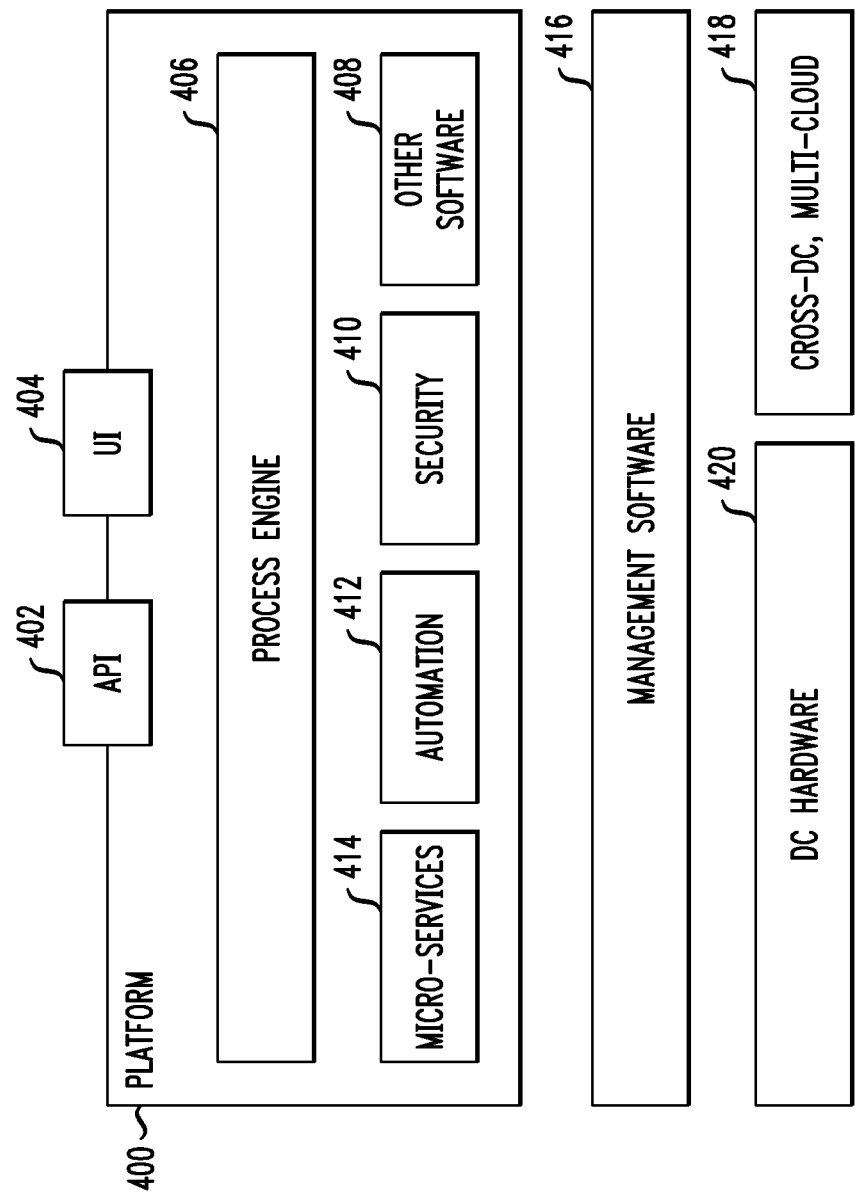
FIG. 4 shows cloud resource planning architecture in an illustrative embodiment.

FIG. 4 shows cloud resource planning architecture in an illustrative embodiment. By way of illustration, FIG. 4 depicts a CRP platform 400, which includes an API 402 and UI 404 for interaction with users. Additionally, the platform 400 includes a process engine 406 (which can incorporate AI functionality), a micro-services component 414, an automation component 412, a security component 410, and other software 408. FIG. 4 also depicts management software 416, data center (DC) hardware componentry 420, and cross-DC, multi-cloud componentry 418. The management software 416 can include low-level data center operations software, such as maintenance (patching, updating, upgrading), monitoring, auto-discovery, and software-defined-everything components. Such management software 416 can be hardware- and/or data center-specific, and therefore not part of the platform (as different servers can have different management software pieces with which they interact). As such, the management software 416 can communicate with the DC hardware 420 via one or more APIs and provide information (such as health status, general availability, etc.) about the DC hardware 420 up to the platform 400.

The cross-DC, multi-cloud componentry 418 facilitates platform communication between data centers, such as direct virtual private network (VPN) tunnels or multiprotocol label switching (MPLS) circuits. Via the multi-cloud aspect of component 418, the platform 400 can interact with a variety of types of clouds.

As illustrated in FIG. 4, at least one embodiment of the invention can include combining micro-services 414, automation components 412, security components 410, and other (standard off-the-shelf) software 408 into comprehensive value-creating processes. In one or more embodiments of the invention, AI-components in the process engine 406 allow for smart process execution, internally and externally. For example, CRP processes can include multi-cloud deployment optimization, as well as total cloud supply chain optimization. Such cloud supply chain optimization can include, for example, enhancing the supply chain by recommending new components, suppliers, etc.

Accordingly, via at least one embodiment of the invention, enterprise partners, suppliers and customers can experience the CRP platform as a one-stop portal for cloud products and the related lifecycle management of (complex) orchestrated landscapes. As detailed herein, customers can experience a cohesive monitoring and management plane for an entire IT landscape, with the CRP platform providing financial and technical views, as well as customer-specific optimization of IT-supported business. Also, a CRP platform can unite existing enterprise resource planning (ERP), customer relationship management (CRM), supply chain management (SCM), procurement, monitoring and customer support systems onto a single data and process plane.

As additionally detailed herein, in one or more embodiments of the invention, CRP-related IT tooling (such as data gathering, provisioning, troubleshooting, etc.) is hardware agnostic, and service support tools for provisioning and lifecycle support are infrastructure-independent. Similarly, in at least one embodiment of the invention, a CRP platform can support various cloud service deployment platforms and related infrastructure via APIs and vendor-provided plug-ins.

Further, one or more embodiments of the invention can include facilitating, via the CRP platform, scaling a business and related applications and services on-demand up or down across multi-cloud and multi-service environments. Such an embodiment can include implementing end-to-end process support via artificial intelligence, including functionality such as selecting optimal vendors, products and/or contracts, and suggesting collaboration partners from different and/or similar industries. Also, in one or more embodiments of the invention, a CRP platform can encompass the use of one or more legacy applications, software as a service (SaaS), infrastructure as a service (IaaS), platform as a service (PaaS), integration, on premise software, etc.

Figure 5:
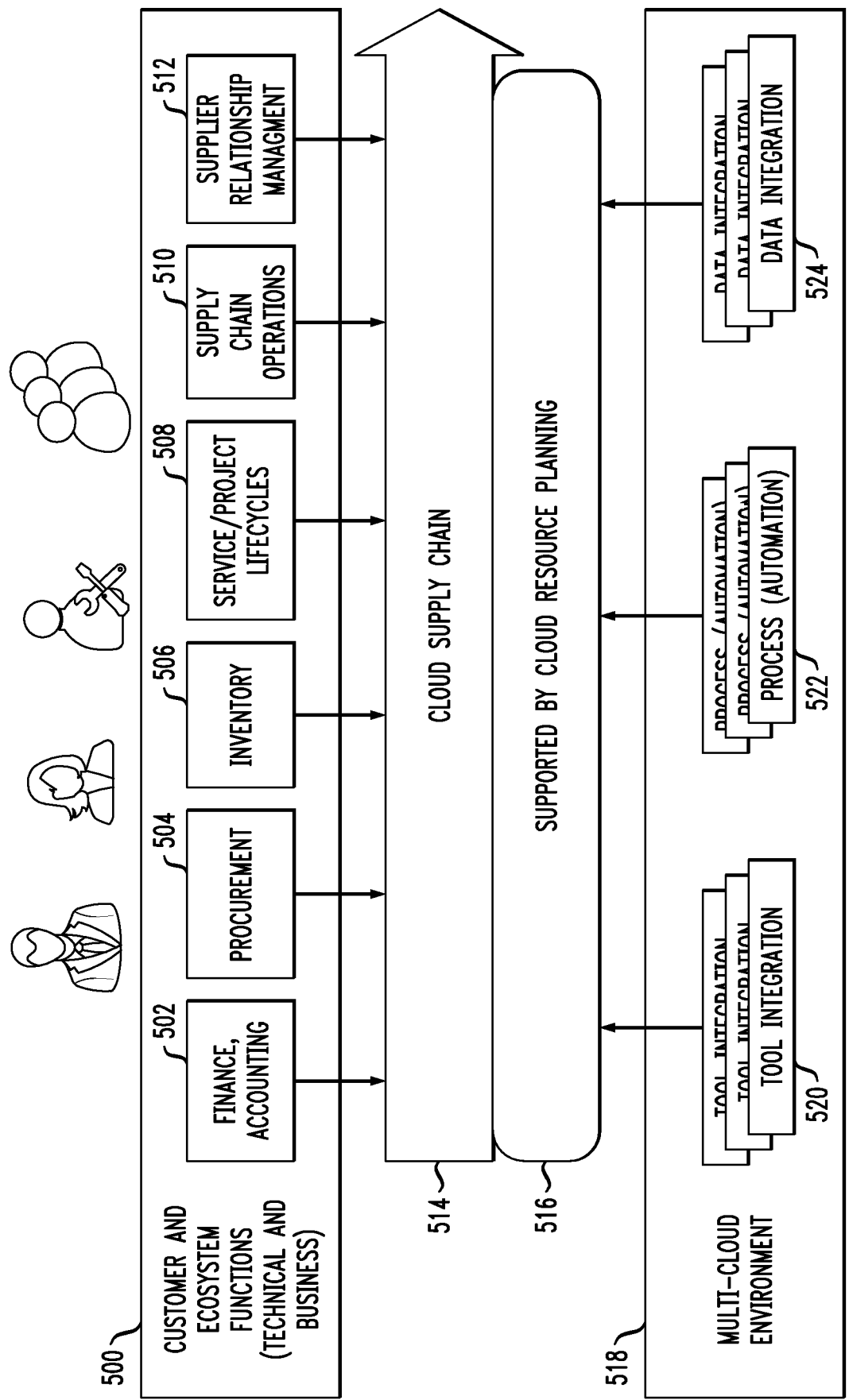
FIG. 5 shows supply chain aspects of cloud resource planning in another illustrative embodiment.

FIG. 5 shows supply chain aspects of cloud resource planning in another illustrative embodiment. By way of illustration, FIG. 5 depicts a collection of example customer and ecosystem functions 500 such as finance and accounting functions 502, procurement functions 504, inventory functions 506, service and/or project lifecycle functions 508, supply chain operations 510, supplier relationship management functions 512, etc. Such functions 500 are incorporated into a cloud supply chain 514, which can be supported by a CRP platform 516. Specifically, the CRP platform 516 can help an organization compose, execute, monitor, manage and optimize its cloud supply chain 514, as well as procurement, inventory, finance, service lifecycle, projects, human resources and other components of a service fulfillment through a common dashboard. The CRP platform 516 can serve as a service entry point for business and technical enterprise roles, integrating the customer and ecosystem functions 500 with tools 520, automated processes 522, and data 524 from a multi-cloud environment 518. Such a multi-cloud environment 518 can include, for example, an enterprise cloud and one or more public clouds.

Figure 6:
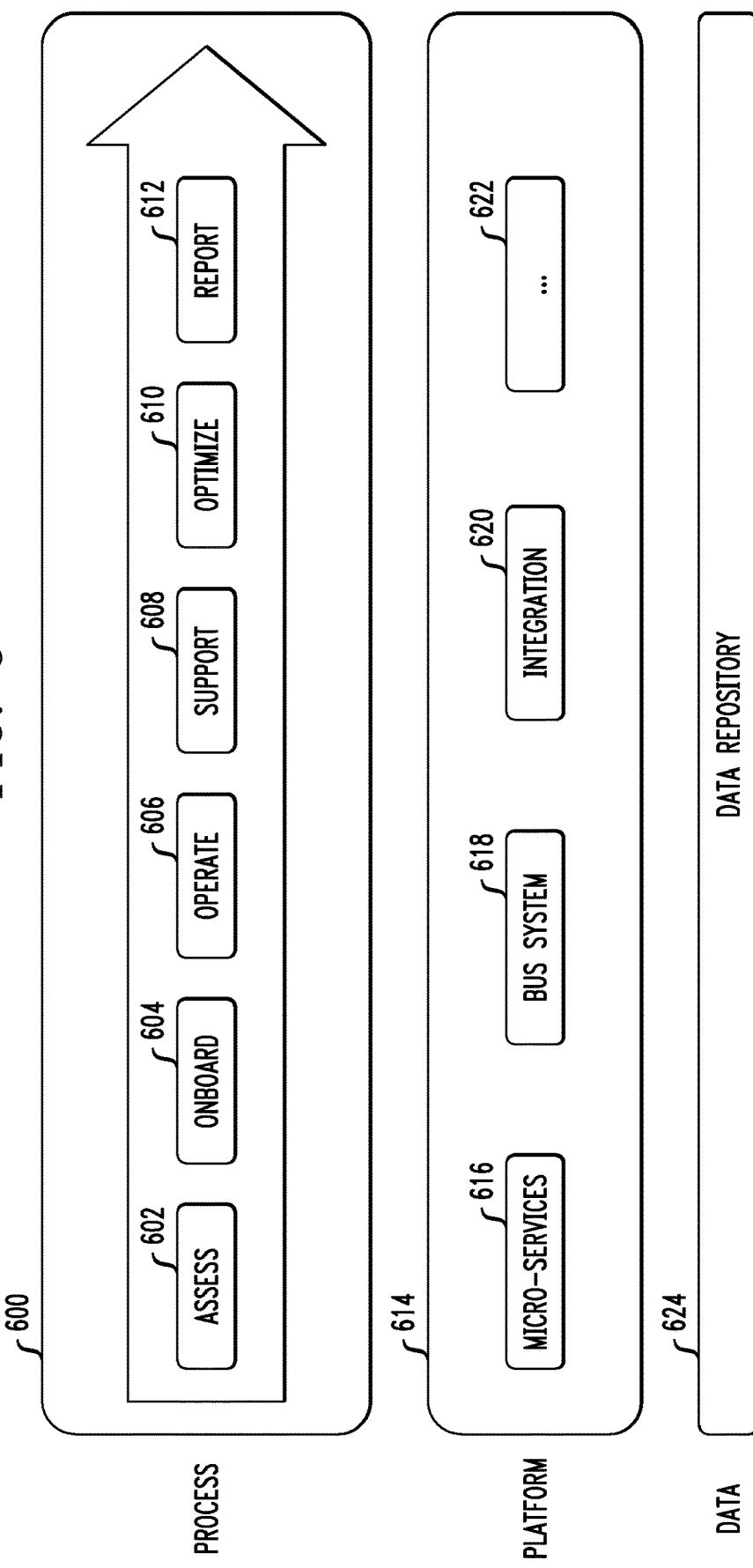
FIG. 6 shows a system view of cloud resource planning in an illustrative embodiment.

FIG. 6 shows a system view of cloud resource planning in an illustrative embodiment. By way of illustration, FIG. 6 depicts a process layer 600, a platform layer 614, and a data layer 624. The process layer 600, which can include, for example, an assessment process 602, an onboarding process 604, an operation process 606, a support process 608, an optimization process 610, and a reporting process 612, can carry out intelligent process handling via automation. The platform layer 614 can include micro-services 616, communication via a bus system 618, a full tool landscape integration 620, and one or more additional components 622. Further, as illustrated, the data layer 624 can include a data repository (from across the supply chain, for example) derived from one or more systems and smart agents.

The platform layer 614 can also allow for catalog functions, which enable an enterprise to select one or more service providers based on capability, rating, successful deployments, etc. In one or more embodiments of the invention, such a catalog of offerings is compliant with one or more enterprise parameters and/or requirements, and allows for the enterprise to selectively show offerings based on one or more end-customer attributes. Such offerings can be priced by allowing pricing engines to perform pricing in real-time via a service interface. Additionally, as detailed herein, similar to service modules, the usage of technical integration adapters for cloud resources can be catalog-based and ensure compatibility across a service fulfillment. In at least one embodiment of the invention, a logical cloud service check ensures that the technical and business processes across the service provisioning cycle can be supported by the chosen service modules, and as that they are supported by the chosen cloud resources as integrated through the technical adapters.

Figure 7:
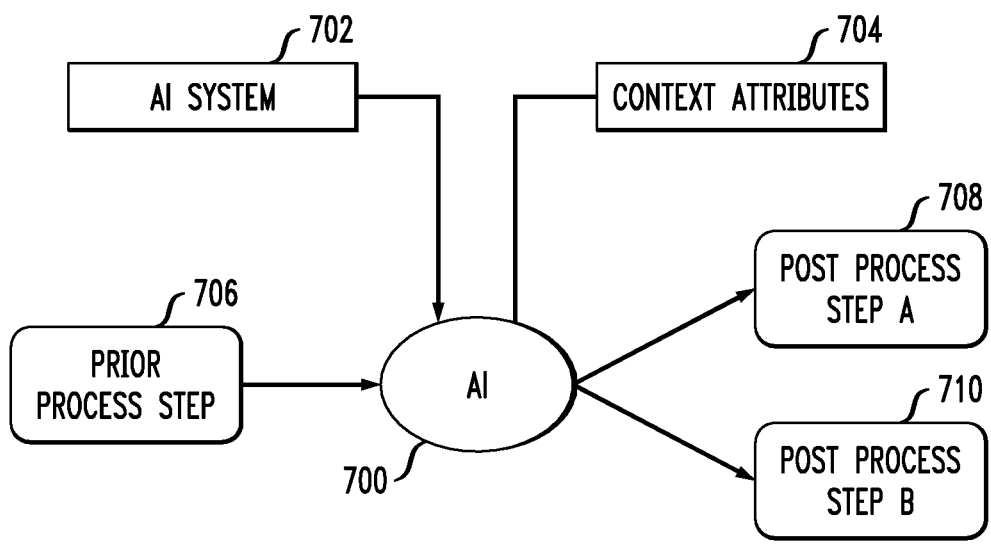
FIG. 7 shows modelling language extension components in an illustrative embodiment.

As further detailed herein, one or more embodiments of the invention include implementing a modelling language extension, which introduces AI routing elements (also referred to herein as AI decision points) and defines one or more context attributes. Such context attributes can include, for example, position in the tree, time of trigger, execution options, etc. Accordingly, FIG. 7 shows modelling language extension components in an illustrative embodiment. The depicted AI-related modelling language extension 700 generates and/or introduces decision points based on recommendations from AI-based systems 702 and enable an autonomous process flow from a prior process step 706 to one of a first post-process step 708 and/or a second post-process step 710 (or multiple additional post-process steps). Additionally, AI system 702 input can also set one or more context attributes 704 for each AI decision point during process execution runtime (for example, via tree branch probabilities, process costs/benefit analyses, etc.). The context attributes 704 will be interpreted by the process execution engine (such as depicted in FIG. 8) as inputs for an operations research optimization across the total process.

Consequently, and as further detailed herein, each decision point will receive input from the optimization engine, and that input will set additional attributes in the AI-decision point. Such additional attributes can include, for example, a probability of one or more events, a cost and revenue time series, decision tree information, etc. One important attribute, which is set by the optimization engine, determines the final decision to go to post process step A (708) or post-process step B (710). Accordingly, in one or more embodiments of the invention, the decision point not only has decision capability based on incoming data, but the decision point receives additional process execution orders from the optimization engine on how to move forward (within the process flow). The context attributes can be used for process interpretation and for historic persistent storage of data that lead to the particular decision.

Figure 8:
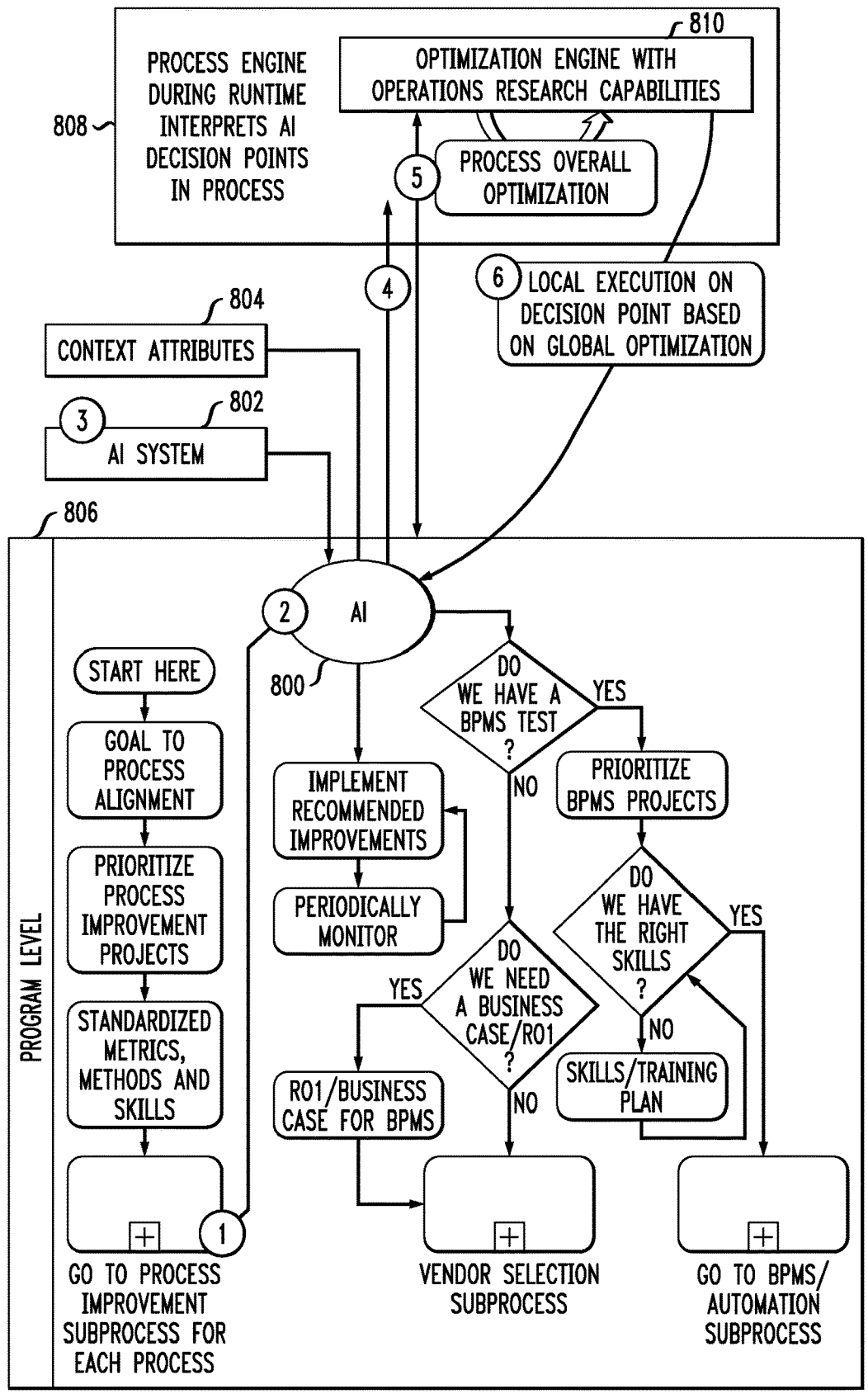
FIG. 8 shows a process execution engine in an illustrative embodiment.

FIG. 8 shows a process execution engine in an illustrative embodiment. Specifically, FIG. 8 depicts an example iteration of a single AI-based decision point. In step 1, a process step in a process flow 806 triggers an AI-based modelling language extension 800 to introduce an AI-based decision point (into the process flow 806). In step 2, the modelling language extension 800 activates the AI-based decision point and gathers input during runtime from a related, connected AI system 802 (the AI system 8002 can utilize live and/or historic data from other systems). Additionally, in step 3, the AI system 802 sets the decision point-specific context attributes 804. In step 4, the AI-based decision point reports its context attributes 804 to a process engine 808, which interprets the AI-based decision point during run-time of the process. In step 5, the process engine 808 activates the included optimization engine 810, which deploys one or more operations research models, such as decision trees or linear programming. The optimization engine 810 gathers input from all AI-based decision points subsequent to the decision point in question (via a recursive procedure) to determine an end-to-end overall process optimization (maximum or minimum, depending on the problem). In at least one embodiment of the invention, the optimization engine 810 can apply one or more optimization algorithms from an operations research field during process runtime execution. Further, in step 6, the global (end-to-end) optimization path generated by the optimization engine 810 is used to determine the local execution of the AI-based decision point in the process flow 806.

Such as the example depicted in FIG. 8, one or more embodiments of the invention include the use of a flexible execution engine with an AI decision interpreter. Such an engine can be used, for example, in applications such as enterprise cloud computing service process routing, and multi-cloud management. At least one embodiment of the invention can additionally include modifying and/or extending existing engines by incorporating the capability to include interpretation of AI-based decision point components.

In one or more embodiments of the invention, the attributes of each AI-based decision point can be fed into a respective algorithm, which will determine the process step A versus process step B routing decision, wherein step A and step B are post-process steps in the prescribed technical or business process. By way of example, AI-decision point information can be used to determine the correct deployment scenario for a customer IT system based on customer data, or a decision point can contain attributes about deployment costs for steps A and B, which can be used to optimize the overall deployment and operations cost of the system. Additionally, as AI system input can vary over time, an optimization in subsequent steps can vary during further process execution (for example, a decision now can be rendered sub-optimal in a few minutes for a spot market).

Example implementations of one or more embodiments of the invention can include routing customer service requests to a self-service portal, to a managed service offering, to a customer- or situation-specific promotion or deal, incorporating customer feedback into deployment and service processes, etc. Additionally, in a multi-cloud optimization implementation, at least one embodiment of the invention can include advising end-customers on deployment options based on performance, security, general capabilities, costs, etc., as well as advising and autonomously executing a deployment including sizing of IT systems, based on machine learning algorithms and rules. Further, one or more embodiments of the invention can include running simulations based on AI-based decision points, wherein AI-based decision points enable a simulation engine to incorporate provided situation- and context-specific cognitive information, such as smart decisions based on data growth, competitor landscape, expansion plans, general financial budget, etc. Such an embodiment can enable simulation engines to use operationally-proven processes to be used during simulations, whereby the information for decision points is retrieved from AI systems.

Figure 9:
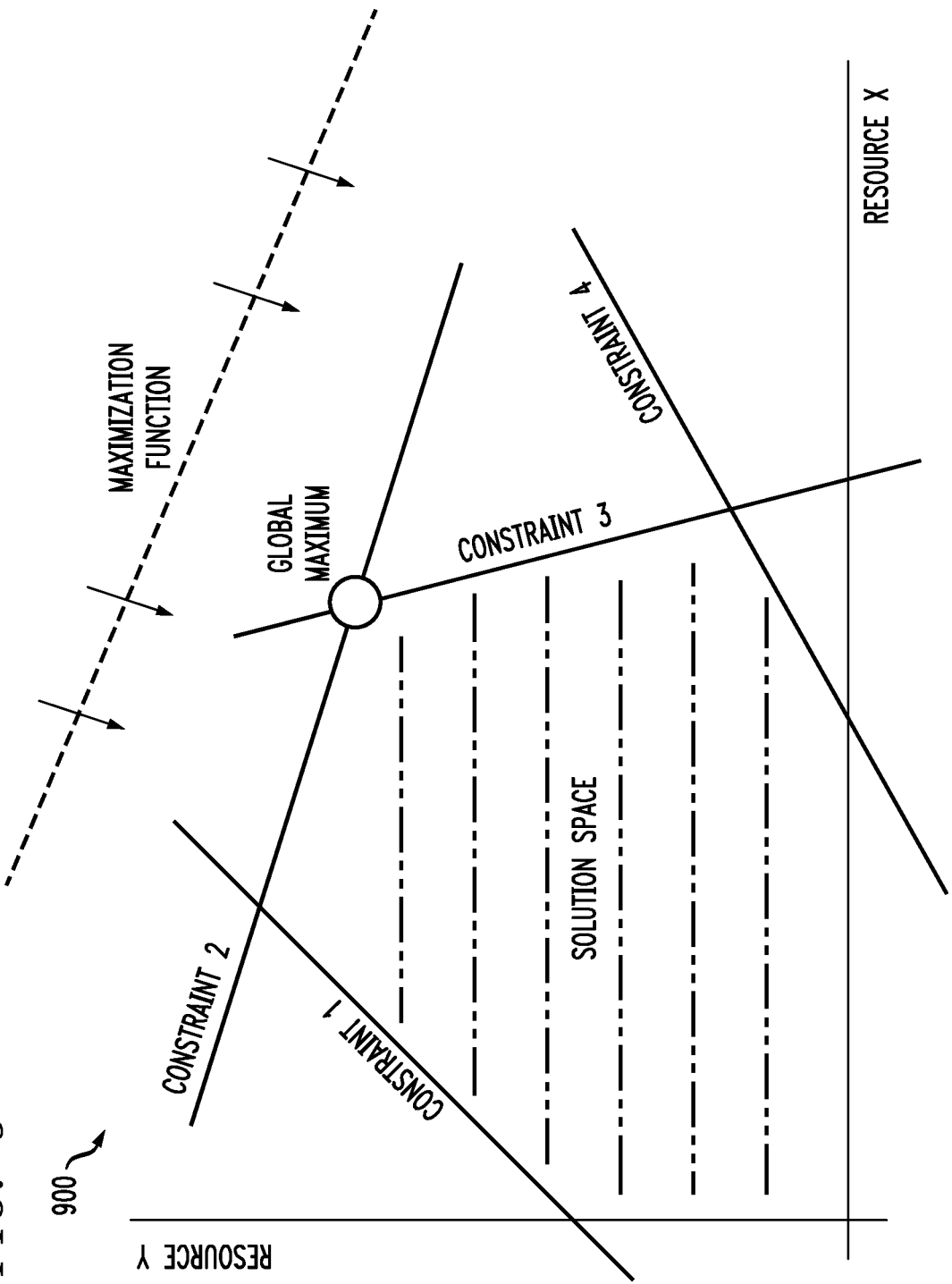
FIG. 9 shows an example linear programming solution graph in an illustrative embodiment.

FIG. 9 shows an example linear programming solution graph 900 in an illustrative embodiment. Specifically, FIG. 9 depicts a generic linear programming solution space, in connection with a maximization function, for two resources (Resource X and Resource Y) with multiple constraints (Constraint1, Constraint2, Constraint3, and Constraint4).

FIG. 10 shows an example linear programming formula 1000 in an illustrative embodiment. Specifically, FIG. 10 depicts an example linear programming formula 1000 for maximization of a margin over a resource ask per deployed capacity and respective usage. The linear programming formula 1000 describes an optimization problem, wherein the margin for a certain deployment is to be optimized. Accordingly, resources for the deployment should be used according to the resource constraints ($\leq q_n$), while optimizing the overall margin. Such an optimization problem might be considered, for example, in a use case of provisioning storage for virtual systems, wherein there is a desire not to overprovision, while also being driven by system usage and capacity constraints.

As noted herein, the operation of the information processing system 100 is described in further detail with reference to the flow diagram of the example embodiment of FIG. 11. The process as shown includes steps 1100 through 1112, and is suitable for use in the system 100 but is more generally applicable to other systems comprising a processing platform having cloud infrastructure representation functionality. Accordingly, references to components of the embodiment of FIG. 1 in the process description below should not be viewed as limiting in any way, as the disclosed process steps can be applied in a wide variety of other types of information processing systems.

In step 1100, at least one processing platform is configured to include a plurality of processing devices each comprising a processor coupled to a memory. In the context of the FIG. 1 embodiment, information processing system 100 comprises multiple processing platforms 106 and 106' as illustrated in the figure. The one or more additional processing platforms 106' may be configured in substantially the same manner as the processing platform 106. Each such processing platform comprises virtual resources for use by client applications.

In step 1102, at least a portion of at least a first cloud-based system is implemented within the processing platform. For example, with reference to the FIG. 1 embodiment, virtual resources 110 of cloud-based system 112 are implemented within the processing platform 106. As mentioned previously, such virtual resources illustratively comprise containers, virtual machines or combinations thereof. For example, in the context of the FIG. 1 embodiment, the virtual resources may comprise a plurality of containers allocable to respective client applications of the client devices 102 under the control of the cloud-based system 112. As another example, the virtual resources may comprise a plurality of virtual machines allocable to respective ones of the client applications of the client devices 102 under the control of the cloud-based system 112. Numerous other arrangements of virtual resources of various types and combinations can be utilized in other embodiments. For example, the virtual resources can include a plurality of virtual machines and a plurality of containers configured to run on at least a subset of the virtual machines.

In step 1104, multiple artificial intelligence-based decision points are implemented into a process flow. Such a step can be carried out, for example, by modelling language extension module 114 in the FIG. 1 embodiment. The multiple artificial intelligence-based decision points can include routing options encompassing two or more steps within the process flow.

In step 1106, one or more context attributes associated with the multiple artificial intelligence-based decision points based on data derived from one or more artificial intelligence systems are compiled. Such a step can also be carried out, for example, by modelling language extension module 114 in the FIG. 1 embodiment. In at least one embodiment of the invention, the modelling language extension module can be configured to compile one or more context attributes associated with the multiple artificial intelligence-based decision points during run-time of the process. Additionally, in one or more embodiments of the invention, the data derived from one or more artificial intelligence systems can vary with time.

Also, as detailed herein, the one or more context attributes can include, for example, one or more cost values associated with the multiple artificial intelligence-based decision points, one or more benefit values associated with the multiple artificial intelligence-based decision points, and/or one or more tree branch probability values associated with the multiple artificial intelligence-based decision points.

In step 1108, the multiple artificial intelligence-based decision points and the one or more context attributes are converted to input to a process optimization algorithm. Such a step can be carried out, for example, by process engine 116 in the FIG. 1 embodiment. In one or more embodiments of the invention, the process optimization algorithm is a decision tree or a linear program. In such an embodiment, the context attributes are converted into input factors for these algorithms (such as, for example, optimization targets (cost, space, utilization, etc.)).

In step 1110, an overall execution path within the process flow is determined by applying the process optimization algorithm to the converted input. Such a step can be carried out, for example, by optimization engine 118 in the FIG. 1 embodiment. The optimization engine, in applying the process optimization algorithm to the converted input, can analyze a likelihood of one or more events occurring in the process flow. Additionally, in at least one embodiment of the invention, the optimization engine can be configured to determine the overall execution path within the process flow by deploying one or more operations research models during run-time execution of the process. The one or more operations research models can include, for example, one or more decision trees and/or one or more linear programming models.

In step 1112, a decision to a first of the multiple artificial intelligence-based decision points based on the determined overall execution path within the process flow is output. Such a step can also be carried out, for example, by optimization engine 118 in the FIG. 1 embodiment.

Figure 11:
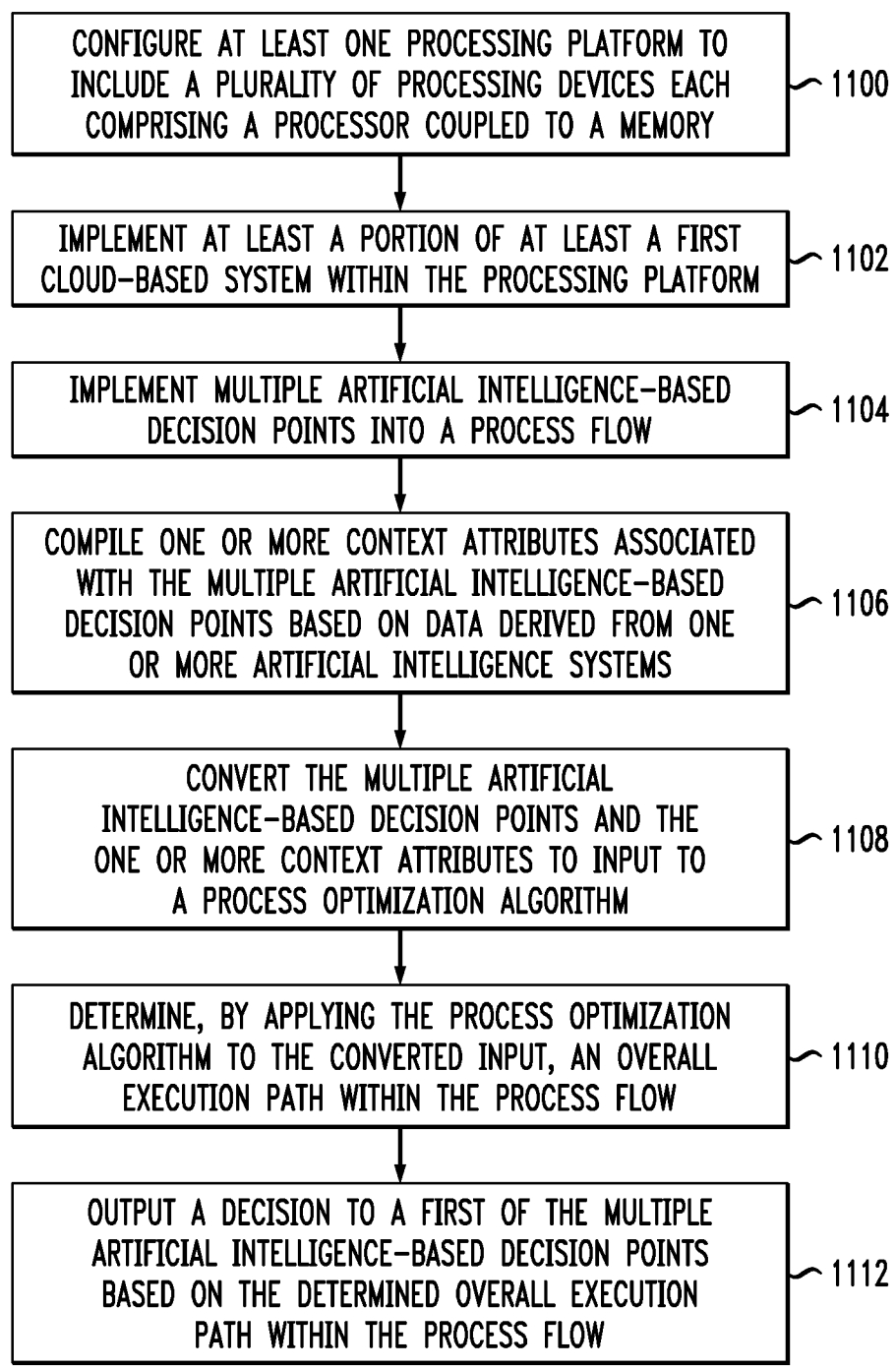
FIG. 11 is a flow diagram of a process for artificial intelligence-enabled enterprise class process execution in an illustrative embodiment.

The particular processing operations and other system functionality described in conjunction with the flow diagram of FIG. 11 are therefore presented by way of illustrative example only, and should not be construed as limiting the scope of the disclosure in any way. Alternative embodiments can use other types of processing operations involving cloud infrastructure representation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to carry out the techniques of one or more embodiments of the invention detailed herein.

Functionality such as that described in conjunction with the flow diagram of FIG. 11 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of delivering enterprise cloud resources and services using composable business and technical processes as disclosed herein can provide a number of significant advantages relative to conventional arrangements.

For example, some embodiments can advantageously provide optimization of multi-cloud deployments during run-time on a process level. Also, one or more embodiments implement AI-based management of cloud services to lower operations cost, increase customer satisfaction and raise margins across services.

Such arrangements overcome the difficulties that would otherwise be associated with existing approaches limited by required human intervention in process execution techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
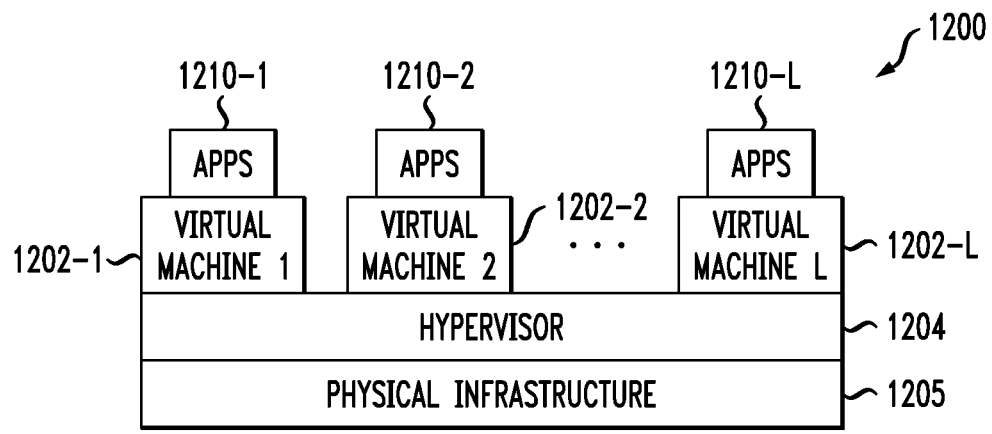
FIGS. 12 and 13 show examples of processing platforms that may be utilized to implement at least a portion of an information processing system in illustrative embodiments.
Figure 13:
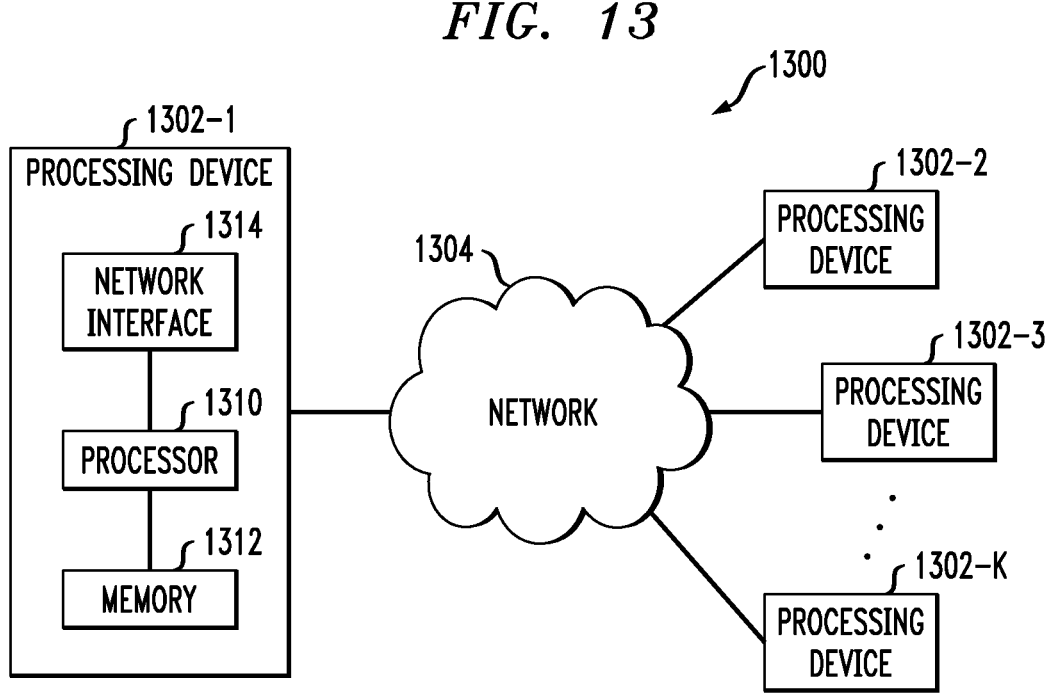

FIG. 12 shows an example processing platform comprising cloud infrastructure 1200. The cloud infrastructure 1200 comprises a combination of physical and virtual processing resources that may be utilized to implement at least a portion of the information processing system 100. The cloud infrastructure 1200 comprises virtual machines (VMs) 1202-1, 1202-2, . . . 1202-L implemented using a hypervisor 1204. The hypervisor 1204 runs on physical infrastructure 1205. The cloud infrastructure 1200 further comprises sets of applications 1210-1, 1210-2, . . . 1210-L running on respective ones of the virtual machines 1202-1, 1202-2, . . . 1202-L under the control of the hypervisor 1204.

Although only a single hypervisor 1204 is shown in the embodiment of FIG. 12, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 1204 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA) or other type of processing circuitry, as well as portions or combinations of such circuitry elements.

The memory 1312 may comprise random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide enterprise cloud resources and services using composable business and technical processes. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least one processing platform comprising a plurality of processing devices each comprising a processor coupled to a memory;
the processing platform being configured to implement at least a portion of at least a first system;
wherein the processing platform is configured:
to implement multiple artificial intelligence-based decision points into a process flow, wherein the multiple artificial intelligence-based decision points comprise a first artificial intelligence-based decision point and one or more additional artificial intelligence-based decision points positioned subsequent to the first artificial intelligence-based decision point in the process flow;
to compile one or more context attributes associated with the first artificial intelligence-based decision point based on data derived from one or more artificial intelligence systems;
to convert information pertaining to the one or more additional artificial intelligence-based decision points and the one or more context attributes associated with the first artificial intelligence-based decision point to input to a process optimization algorithm, wherein converting information pertaining to the one or more additional artificial intelligence-based decision points comprises processing input from a plurality of artificial intelligence-based decision points positioned subsequent to the first artificial intelligence-based decision point in the process flow using at least one recursive algorithm;
to determine, by processing the converted input using the process optimization algorithm, an overall execution path within the process flow, wherein determining the overall execution path comprises deploying one or more operations research models during runtime execution of the process, and wherein deploying one or more operations research models comprises optimizing a margin of at least one resource ask, per deployed capacity and respective usage, by processing at least the converted input using one or more linear programming models, wherein the at least one resource comprises storage for one or more virtual systems; and
to output a decision to the first artificial intelligence-based decision point based on the determined overall execution path within the process flow.

2. The apparatus of claim 1, wherein the multiple artificial intelligence-based decision points comprise routing options encompassing two or more steps within the process flow.

3. The apparatus of claim 1, wherein the processing platform is further configured to compile one or more context attributes associated with the multiple artificial intelligence-based decision points during run-time of the process.

4. The apparatus of claim 1, wherein the data derived from one or more artificial intelligence systems vary with time.

5. The apparatus of claim 1, wherein the one or more context attributes comprise one or more cost values associated with the multiple artificial intelligence-based decision points.

6. The apparatus of claim 1, wherein the one or more context attributes comprise one or more benefit values associated with the multiple artificial intelligence-based decision points.

7. The apparatus of claim 1, wherein the one or more context attributes comprise one or more tree branch probability values associated with the multiple artificial intelligence-based decision points.

8. The apparatus of claim 1, wherein the processing platform, in processing the converted input using the process optimization algorithm, is further configured to analyze a likelihood of one or more events occurring in the process flow.

9. The apparatus of claim 1, wherein the one or more operations research models comprise one or more decision trees.

10. A method comprising:
implementing multiple artificial intelligence-based decision points into a process flow, wherein the multiple artificial intelligence-based decision points comprise a first artificial intelligence-based decision point and one or more additional artificial intelligence-based decision points positioned subsequent to the first artificial intelligence-based decision point in the process flow;
compiling one or more context attributes associated with the first artificial intelligence-based decision point based on data derived from one or more artificial intelligence systems;
converting information pertaining to the one or more additional artificial intelligence-based decision points and the one or more context attributes associated with the first artificial intelligence-based decision point to input to a process optimization algorithm, wherein converting information pertaining to the one or more additional artificial intelligence-based decision points comprises processing input from a plurality of artificial intelligence-based decision points positioned subsequent to the first artificial intelligence-based decision point in the process flow using at least one recursive algorithm;
determining, by processing the converted input using the process optimization algorithm, an overall execution path within the process flow, wherein determining the overall execution path comprises deploying one or more operations research models during run-time execution of the process, and wherein deploying one or more operations research models comprises optimizing a margin of at least one resource ask, per deployed capacity and respective usage, by processing at least the converted input using one or more linear programming models, wherein the at least one resource comprises storage for one or more virtual systems; and
outputting a decision to the first artificial intelligence-based decision point based on the determined overall execution path within the process flow;
wherein the implementing, compiling converting, determining, and outputting steps are implemented in a processing platform configured to include a plurality of processing devices each comprising a processor coupled to a memory; and
wherein the processing platform is configured to implement at least a portion of at least a first system.

11. The method of claim 10, wherein processing the converted input using the process optimization algorithm comprises analyzing a likelihood of one or more events occurring in the process flow.

12. The method of claim 10, wherein the one or more operations research models comprise one or more decision trees.

13. The method of claim 10, wherein the multiple artificial intelligence-based decision points comprise routing options encompassing two or more steps within the process flow.

14. The method of claim 10, wherein the one or more context attributes comprise one or more cost values associated with the multiple artificial intelligence-based decision points.

15. The method of claim 10, wherein the one or more context attributes comprise one or more benefit values associated with the multiple artificial intelligence-based decision points.

16. A computer program product comprising a non-transitory processor-readable storage medium having stored therein program code of one or more software programs, wherein the program code when executed by a processing platform comprising a plurality of processing devices causes the processing platform:
to implement multiple artificial intelligence-based decision points into a process flow, wherein the multiple artificial intelligence-based decision points comprise a first artificial intelligence-based decision point and one or more additional artificial intelligence-based decision points positioned subsequent to the first artificial intelligence-based decision point in the process flow;
to compile one or more context attributes associated with the first artificial intelligence-based decision point based on data derived from one or more artificial intelligence systems;
to convert information pertaining to the one or more additional artificial intelligence-based decision points and the one or more context attributes associated with the first artificial intelligence-based decision point to input to a process optimization algorithm, wherein converting information pertaining to the one or more additional artificial intelligence-based decision points comprises processing input from a plurality of artificial intelligence-based decision points positioned subsequent to the first artificial intelligence-based decision point in the process flow using at least one recursive algorithm;
to determine, by processing the converted input using the process optimization algorithm, an overall execution path within the process flow, wherein determining the overall execution path comprises deploying one or more operations research models during run-time execution of the process, and wherein deploying one or more operations research models comprises optimizing a margin of at least one resource ask, per deployed capacity and respective usage, by processing at least the converted input using one or more linear programming models, wherein the at least one resource comprises storage for one or more virtual systems; and to output a decision to the first artificial intelligence-based decision point based on the determined overall execution path within the process flow;

wherein the processing platform is configured to implement at least a portion of at least a first system.

17. The computer program product of claim 16, wherein the one or more operations research models comprise one or more decision trees.

18. The computer program product of claim 16, wherein the multiple artificial intelligence-based decision points comprise routing options encompassing two or more steps within the process flow.

19. The computer program product of claim 16, wherein the one or more context attributes comprise one or more cost values associated with the multiple artificial intelligence-based decision points.

20. The computer program product of claim 16, wherein the one or more context attributes comprise one or more benefit values associated with the multiple artificial intelligence-based decision points.

* * * * *